(12) United States Patent
Vining

(10) Patent No.: US 10,160,038 B1
(45) Date of Patent: Dec. 25, 2018

(54) MULTI-SPINDLE MACHINE CONTROL SYSTEM

(71) Applicant: Logan Clutch Corporation, Westlake, OH (US)

(72) Inventor: Michael S. Vining, Lakewood, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 246 days.

(21) Appl. No.: 14/834,537

(22) Filed: Aug. 25, 2015

Related U.S. Application Data

(60) Provisional application No. 62/043,670, filed on Aug. 29, 2014.

(51) Int. Cl.
| | | |
|---|---|---|
| *B23B 13/04* | (2006.01) | |
| *B23Q 5/14* | (2006.01) | |
| *B23B 25/02* | (2006.01) | |
| *B23Q 11/00* | (2006.01) | |
| *B23B 3/30* | (2006.01) | |
| *B23B 9/08* | (2006.01) | |

(52) U.S. Cl.
CPC ............... *B23B 25/02* (2013.01); *B23B 3/30* (2013.01); *B23B 9/08* (2013.01); *B23B 13/04* (2013.01); *B23Q 11/0042* (2013.01); *B23B 2260/044* (2013.01); *B23B 2260/142* (2013.01); *B23B 2270/025* (2013.01); *B23B 2270/027* (2013.01); *B23B 2270/04* (2013.01)

(58) Field of Classification Search
CPC ........... B23B 13/04; B23B 25/02; B23B 3/30; B23B 9/08; B23B 2260/044; B23B 2260/142; B23B 2270/025; B23B 2270/04; B23B 2270/027; B23Q 5/58; B23Q 17/00; B23Q 39/042; G05B 19/4063
See application file for complete search history.

(56) References Cited

U.S. PATENT DOCUMENTS

| | | | | | |
|---|---|---|---|---|---|
| 1,772,148 | A | * | 8/1930 | Hornberger | ............... B23B 7/02 226/158 |
| 1,927,924 | A | * | 9/1933 | De Vlieg | ................ B24B 41/04 384/249 |
| 2,331,719 | A | * | 10/1943 | Oeschger | ................. B23Q 7/12 193/21 |
| 2,577,442 | A | * | 12/1951 | Adams | ...................... B23B 7/10 29/37 R |
| 2,750,025 | A | * | 6/1956 | Nichta | .................... B23B 13/00 226/100 |
| 3,043,166 | A | * | 7/1962 | Dixon | ..................... B23B 31/20 408/68 |
| 3,054,513 | A | * | 9/1962 | Pekrul | ...................... B23Q 7/04 82/124 |

(Continued)

*Primary Examiner* — Sara Addisu
(74) *Attorney, Agent, or Firm* — Ralph E. Jocke; Walker & Jocke

(57) ABSTRACT

A machine control system for a multi-spindle machine includes a controller (42, 86). The controller is operative to reduce the risk of potentially damaging machining chip formation by controlled disengagement of a low speed clutch (18) of a transmission (14) which drives spindles (36) which rotate work pieces. Automatically selectively varying timing and duration of periods of disengagement of the low speed clutch breaks the continuity of chips to reduce the risk of developing damaging conditions as a result thereof.

27 Claims, 8 Drawing Sheets

(56) References Cited

U.S. PATENT DOCUMENTS

| | | | | |
|---|---|---|---|---|
| 3,176,553 A * | 4/1965 | Schubert | B23B 31/00 | 279/4.09 |
| 3,419,160 A * | 12/1968 | Azuma | B23B 13/00 | 414/15 |
| 3,608,915 A * | 9/1971 | Hohwart | B23B 31/4033 | 279/156 |
| 3,614,250 A * | 10/1971 | Connolly | B23B 3/26 | 408/130 |
| 3,814,299 A * | 6/1974 | Spercel | B23B 13/024 | 226/149 |
| 3,863,528 A * | 2/1975 | Wiesner | B23Q 5/26 | 82/11.5 |
| 3,946,298 A * | 3/1976 | van de Loo | G05B 19/238 | 318/685 |
| 3,955,687 A * | 5/1976 | Flisch | B23B 13/04 | 198/736 |
| 4,030,385 A * | 6/1977 | Scholin | B23B 5/00 | 82/101 |
| 4,088,230 A * | 5/1978 | Doe | B23B 13/04 | 414/15 |
| 4,163,514 A * | 8/1979 | Ramunas | B23B 13/024 | 226/141 |
| 4,304,347 A * | 12/1981 | Finzer | B21D 43/11 | 226/150 |
| 4,357,846 A * | 11/1982 | Primo | B23B 5/365 | 408/129 |
| 4,407,176 A * | 10/1983 | Link | B23B 13/02 | 414/17 |
| 4,487,275 A * | 12/1984 | Froehlich | B23B 51/0045 | 175/170 |
| 4,523,449 A * | 6/1985 | Moriyama | B21D 11/10 | 226/158 |
| 4,637,285 A * | 1/1987 | Mizoguchi | B23B 29/03439 | 408/181 |
| 4,758,121 A * | 7/1988 | Kwech | B23B 29/02 | 408/104 |
| 4,773,250 A * | 9/1988 | Miyazaki | B21F 1/00 | 72/336 |
| 5,016,334 A * | 5/1991 | Kovalenko | B23Q 5/14 | 29/38 B |
| 5,095,789 A * | 3/1992 | Mukai | B23Q 1/5468 | 29/37 R |
| 5,154,105 A * | 10/1992 | Berdich | B23B 31/06 | 279/155 |
| 5,157,998 A * | 10/1992 | Herrbach | B23Q 1/527 | 82/118 |
| 5,174,179 A * | 12/1992 | Hiestand | B23B 31/16195 | 279/106 |
| 5,180,209 A * | 1/1993 | Bieri | B28D 1/18 | 175/292 |
| 5,299,351 A * | 4/1994 | Takahashi | B23P 19/001 | 221/11 |
| 5,642,650 A * | 7/1997 | Roote | B23B 13/06 | 82/126 |
| 5,730,037 A * | 3/1998 | Manning | B23Q 5/58 | 408/5 |
| 5,910,201 A * | 6/1999 | Muscarella | B23Q 1/015 | 82/129 |
| 5,911,804 A * | 6/1999 | Haller | B23B 13/04 | 82/1.11 |
| 5,979,267 A * | 11/1999 | Yonezawa | B23Q 1/28 | 279/4.07 |
| 6,438,813 B1 * | 8/2002 | Bernhard | B23Q 5/145 | 29/39 |
| 6,510,769 B1 * | 1/2003 | Kalinsky | B23Q 7/042 | 82/124 |
| 6,848,347 B1 * | 2/2005 | Kalinsky | B23B 13/04 | 82/1.11 |
| 6,883,407 B2 * | 4/2005 | Smith | B23B 31/4033 | 279/155 |
| 8,146,465 B2 * | 4/2012 | Schaerer | B23B 13/025 | 414/15 |
| 2003/0154831 A1 * | 8/2003 | Nowak | B23G 1/08 | 82/129 |

* cited by examiner

MULTI-SPINDLE MACHINE CONTROL SYSTEM

TECHNICAL FIELD

This invention relates to equipment used to machine metal work pieces. An exemplary embodiment relates to a multi-spindle machine with a control system that selectively breaks the continuity of metal chips formed during machining processes.

BACKGROUND

Multi-spindle machines are well known. Such machines include multi-spindle screw machines, multi-spindle lathes, and multi-spindle machining centers. Such machines can be used to produce a wide variety of metal parts. Metal parts produced by such machines may be of many different configurations and materials.

Metal machining processes such as turning, drilling, cutting and other processes where metal is removed by one or more cutting tools, produces metal chips. The metal chips are the generally thin flexible metal shavings that are removed from the work piece at the point(s) of engagement between the work piece and the cutting tool. Depending on the nature of the cutting tool, the material of the work piece, the machining speed and other factors, the nature and properties of the chips that are formed can vary widely. For some materials and cutting operations, the chips may be continuous stringers of substantial length. Such long chips can create problems in the machining process. Specifically such chips may form into large mats or balls which may sometimes be referred to as "birds nests." Such accumulations of long chips can foul the mechanisms of the machine. Such chips can also impede the cutting tools or damage the work pieces. Such circumstances may result in the need for the machine operator to manually clear the chips and/or repair the machine. This results in down time, lower production rates and increased costs.

Multi-spindle machines and other machining systems may benefit from improvements.

DISCUSSION OF EXEMPLARY EMBODIMENTS

It is an object of an exemplary embodiment to provide an improved machining device and system.

It is a further object of exemplary embodiments to provide an improved machine control system for multi-spindle machines.

It is a further object of exemplary embodiments to provide an improved control system for multi-spindle machines that enables the machine to operate more efficiently and with higher productivity.

It is a further object of exemplary embodiments to provide a multi-spindle machine control system that enables more efficient operation of a machine.

It is a further object of exemplary embodiments to provide a multi-spindle machine control system that operates to produce numerous different types of parts more efficiently.

It is a further object of exemplary embodiments to provide a control system for a multi-spindle machine that operates to selectively break the continuity of chips produced by cutting tools so as to reduce the risk of problematic conditions.

Further objects of exemplary embodiments will be made apparent in the following Detailed Description of Exemplary Embodiments and the appended claims.

At least some of the foregoing objects may be accomplished in an exemplary arrangement by a multi-spindle machine that is controlled by an electronic control system. The electronic control system operates to control high and low speed clutches so that machining operations are performed quickly and reliably at multiple stations to which work pieces are moved by the multi-spindle machine. In the exemplary arrangement, the control system operates to engage the high speed clutch as the machine moves work pieces between stations where the work pieces undergo machining. The machine control system operates to disengage the high speed clutch and engage the low speed clutch while the work pieces undergo machining. This may include in exemplary arrangements the drilling, turning, threading or other metal cutting operations that occur concurrently on multiple work pieces as parts are produced from stock material by the machine.

The exemplary control system operates the low speed clutch while the work pieces undergo machining in order to provide relative movement of the work pieces and tools at the proper speeds to accomplish the machining operations. The low speed clutch also causes movable machining tools and other coupled tools to move responsive to power transmission structures that are driven by the low speed clutch.

In the exemplary arrangement as the work pieces undergo machining during the low speed portion of the machine cycle, the low speed clutch is selectively disengaged by the control system for short periods of time. The timing and duration of the disengagement periods of the low speed clutch are controlled responsive to machining data stored in at least one data store of the control system. The timing and duration of the disengagement periods is configured to cause the rotational speeds of the work pieces to slow or stop. The periods of disengagement also result in torque pulses which act on the rotating work pieces. These speed changes and pulsing forces are configured to create discontinuities in chips that are being formed at the point of engagement of a cutting tool and the work piece. In exemplary arrangements the periods of disengagement are configured to prevent the formation of long and stringy chips which can damage the machine or the work pieces therein.

Some exemplary embodiments may include capabilities for storing machining data for numerous different types of materials, parts and/or cutting tools. The control system is operative to enable an operator to provide inputs to select the appropriate stored machine data for controlling the machine. The machine then operates in accordance with the selected machining data so as to reduce the risk of problems and to maintain high productivity.

In still other exemplary arrangements exemplary control systems may enable operators to control the machine by inputs to the controller. The use of manual real time control enables the operator to control the periods of disengagement of the low speed clutch in a way that provides a suitable approach to reducing undesirable chip formation. The exemplary controller may enable the machine operator to store the data corresponding to their manual control activity as machining data. The machine can then use this machining data on a repetitive basis in machining the same part so as to break the continuity of chips and reduce the risk of undesirable chip formation.

In still other exemplary arrangements the control system may operate to control other devices on the machine in addition to the high and low speed clutch to avoid undesirable chip formation. This may include, for example, controlling brakes, servo motors, pneumatic cylinders and other types of actuators to break the continuity of chips by keeping the chip configuration within suitable sizes which reduces the risk of problems.

Of course these approaches are exemplary and additional features and approaches may be used as will be apparent to those skilled in the art from the description provided herein.

DETAILED DESCRIPTION OF EXEMPLARY EMBODIMENTS

Figure 1:
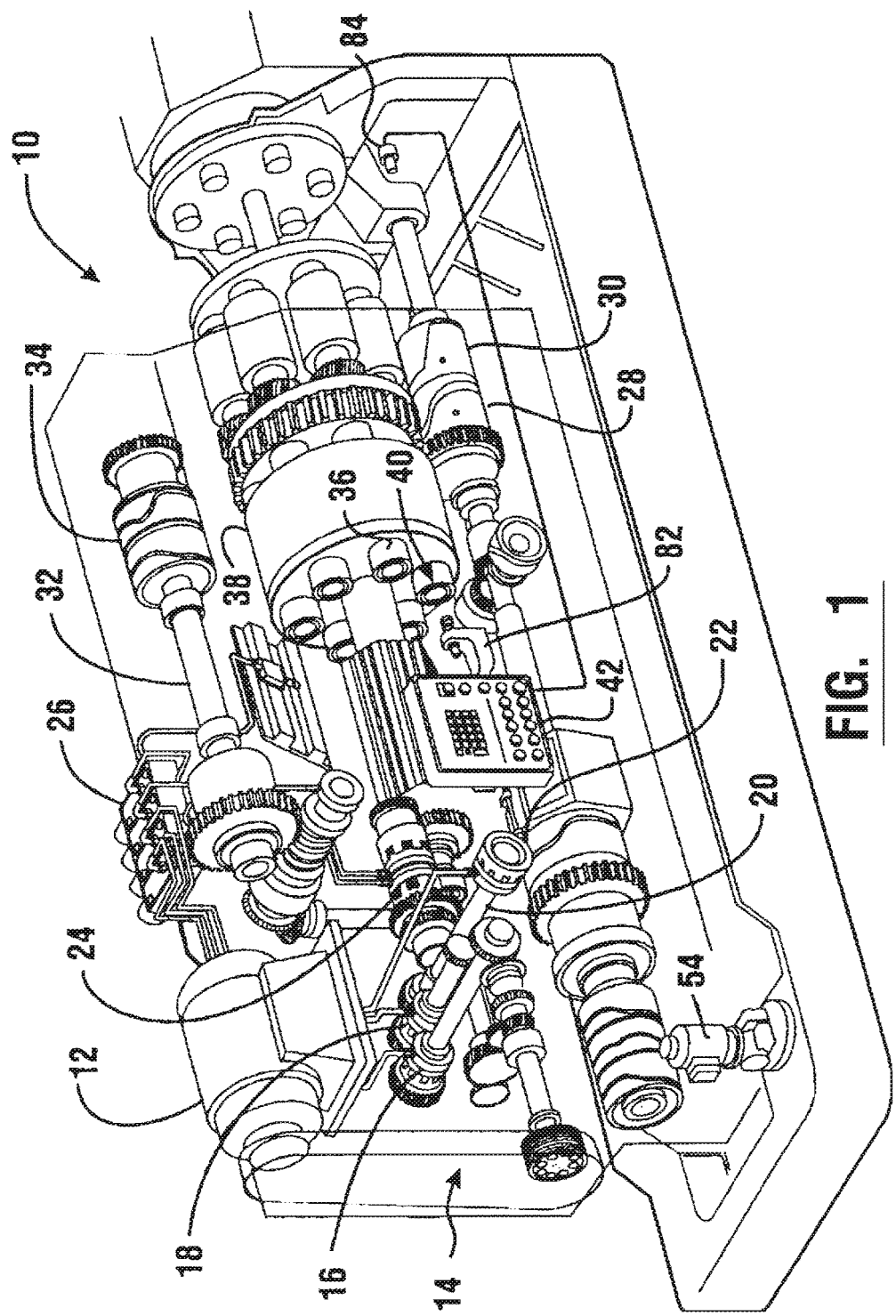
FIG. 1 is a transparent isometric partial view of an exemplary multi-spindle machine including a control system which is operative to implement features of exemplary embodiments.

Referring now to the drawings and particularly to FIG. 1, there is shown therein an exemplary multi-spindle machine 10. It should be understood that multi-spindle machine 10 is but one of numerous different types of machines to which the principles described herein may be applied. In this exemplary embodiment multi-spindle machine 10 is a multi-spindle screw machine used to machine work pieces from metal bar stock. It should be understood that the principles and approaches described herein may apply to other types of multi-spindle machines such as multi-spindle lathes, multi-spindle machining centers and other types of machining devices that involve cutting and turning of metal work pieces.

The exemplary machine 10 includes a main drive motor 12. In the exemplary machine the main drive motor operates the components on the machine that perform machining operations on the work pieces. The main drive motor operates to drive the components of the machine through a transmission which is generally referred to as 14.

The exemplary transmission 14 includes components including a high speed fluid actuated clutch 16 and a low speed fluid actuated clutch 18. In the exemplary arrangement the high and low speed clutches are pneumatically actuated. However, in other arrangements hydraulic actuated or electric actuated clutches may be used. The high speed and low speed clutches are selectively actuated to drive a main drive shaft 20 to rotate at either a high speed or a relatively lower speed. The speed of the main drive shaft of the exemplary machine controls the speed at which other components move. The exemplary machine has a pneumatically actuated clutch brake 22 in operative connection with the main drive shaft. Transmission 14 also includes threading clutches 24. The threading clutches operate in a manner later described to accomplish threading operations on work pieces. Electrically actuated fluid control valves 24 operate to apply and release fluid pressure to the clutches, brake and other fluid pressure actuated components on the machine.

In the exemplary machine the main drive motor 12 is also operative to drive through the transmission, a main drum shaft which is also referred to as a timing shaft 28. Timing shaft 28 is in operative connection with a plurality of cams 30. The cams are operative to actuate mechanisms within the machine. The exemplary transmission 14 also drives an overhead shaft 32 which also has a plurality of cams 34 thereon. In the exemplary arrangement the main motor drives the main timing shaft 28 and the overhead shaft 32 in coordinated relation so that the main timing shaft and overhead shaft always have the same relative rotational positions.

Work pieces that are formed through machining operations carried out by the machine are carried on six spindles 36. The spindles are located on a main spindle carrying drum 38. It should be understood that while the exemplary arrangement shows six spindles, other machines may have different numbers of work piece carrying spindles. The exemplary spindles consist of rotatable spindles which can selectively engage and hold work pieces.

In the exemplary arrangement metal bar stock is fed into the machine at a first spindle position 40 adjacent the bottom of the drum. The work pieces carried by each spindle are then rotatably indexed through each of the plurality of work stations in which the work pieces undergo machining. The machining is accomplished by engagement with cutting tools and other devices in each station. Each work piece is moved through the multiple different stations and machining is accomplished so that a completed part is produced and is cut off from the bar stock before the drum returns to the first position. In the exemplary arrangement all the spindles rotate the work pieces in the same direction and the work pieces undergo machining generally concurrently in the different stations.

Figure 5:
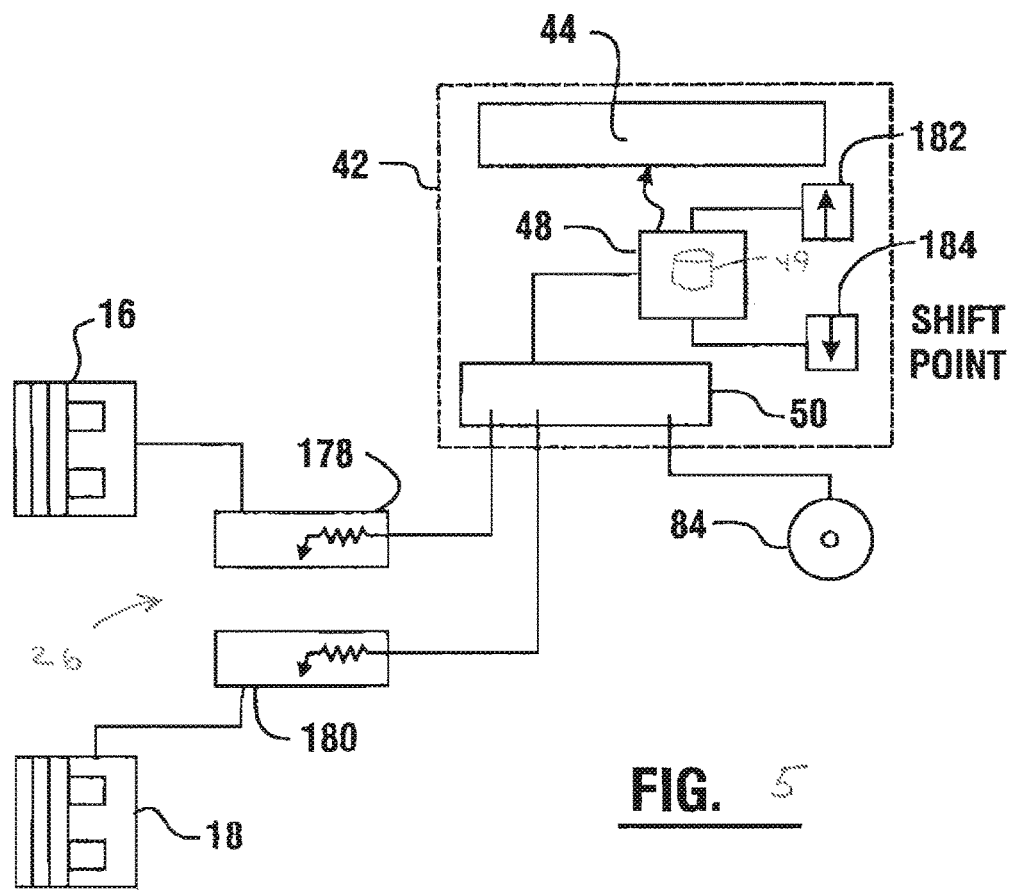
FIG. 5 is a schematic view of an exemplary controller and high and low speed clutches which operate to move various components of the machine.

The exemplary machine includes a controller 42. As shown in FIG. 5, the exemplary controller includes a display 44 which serves as an output device. The exemplary controller also includes a plurality of input devices such as buttons 46. In the exemplary arrangements the controller may include numerous different types of input devices which are operative to receive manual inputs as well as other types of inputs from an operator or other source of instructions.

As represented schematically in FIG. 5, the exemplary controller includes circuitry including at least one processor 48. The circuitry which comprises a plurality of circuits configured to operate the machine, is in operative connection with one or more data stores 49. The exemplary data stores include data corresponding to processor executable instructions which are usable to control operation of the machine. Data stores 49 also include machining data and other information that is usable to control the machine in a manner hereinafter described. In exemplary embodiments, the processor circuitry may comprise any electronic device that is configured via processor executable instructions that can be implemented in either hardware circuits, software, firmware or applications that are operative to enable the processors to execute instructions and process data to carry out the actions described herein. For example, the processor circuitry may correspond to one or more or a combination of a CPU, FPGA, ASIC or any other integrated circuit or other type circuit that is capable of processing data. The processor circuitry may be included in a computer, server or other type of electronic device. The processor circuitry may include or be in operative connection with one or more data stores. Data stores may include volatile or non-volatile computer readable mediums including semi-conductor memory, magnetic memory, optical memory, flash memory, random access memory or any other form of automated memory in which non-transitory processor executable instructions and data may be stored and/or recovered. In exemplary arrangements, computer executable instructions may include instructions in any of a plurality of programming languages and formats, including without limitation, routines, subroutines, programs, threads of execution, objects, methodologies and functions which carry out the actions such as those described herein. Structures of the processor circuitry included in the controller may include, correspond to and/or utilize the principles described in the textbook entitled *Microprocessor Architecture, Programming, and Applications With the* 8085 by Ramesh S. Gaonker (Prentiss Hall, 2002) which is incorporated herein by reference in its entirety. Of course it should be understood that these described circuit structures are exemplary and in other embodiments, other circuit structures for storing, processing, resolving and outputting information may be used.

The circuitry 48 of the exemplary controller operates to drive and provide outputs through the display 44. The circuitry 48 also operates to receive signals from sensors and other types of devices that are included on the machine. The circuitry also operates to provide outputs which are usable to control devices of the machine. The circuitry 48 communicates signals with external devices through suitable interfaces schematically indicated 50. Interfaces 50 may include suitable hardware and software devices that enable the passage of input and output signals to and from the controller. In some exemplary arrangements the controller may include user interfaces at multiple points on the multi-spindle machine. For example in some arrangements control panels may be positioned on opposed sides of the machine so as to enable the operator to selectively control the machine from either side thereof. In such arrangements suitable input devices on each control panel enable the operator to indicate which panel is utilized to provide inputs to the machine and to enable the operator to control the machine during setup and machining operations.

The exemplary multi-spindle machine further includes a coolant pump 54 which operates to provide cutting fluid or other suitable machining lubricant to areas where cutting tools engage work pieces in the machine. In exemplary embodiments the coolant pump operates to provide a flow of machining coolant in the area where the points or bits of cutting tools engage work pieces to facilitate the cutting and shaping of the metal by the cutting tools. The machining coolant also helps to keep the work pieces at a suitable temperature for carrying out the machining activity as well as to help carry away chips that are formed by the action of the cutting tool acting on the work piece. Various types of machining coolant may be used depending on the materials being machined and the operations which are being conducted by the machine. In exemplary embodiments the controller operates in accordance with its programming to control the coolant pump and coolant distribution system such as valves, nozzles and the like to facilitate the machining operations of the machine.

The exemplary machine further includes an encoder 84. Encoder 84 is operative to sense the position of the main timing shaft 28. The encoder 84 is in operative connection with the circuitry 48. The encoder of the exemplary arrangement serves as a sensor to determine the positions of a plurality of different components of the exemplary machine. In other arrangements and machine types, a plurality of sensors may be utilized to determine the respective positions of numerous different components and structures that operate in connection with the machine and move to achieve machining functions. In addition the exemplary machine includes a stock feed sensor 82. Stock sensor 82 of the exemplary embodiment is positioned in the first station 40 where stock is fed into each spindle of the main drum. In the exemplary arrangement the stock sensor 82 is operative to engage the stock that is fed into the spindle to assure that stock is present after feeding action and has not been depleted. Stock sensor 82 is also in operative connection with the controller. Exemplary embodiments of the controller may operate in accordance with its programming to cause the machine to cease operating and to take other steps such as to give an alarm when the stock sensor 82 fails to sense incoming stock at the first work station. This helps to assure that the machine does not index without work pieces in the spindles and avoids possible damage to the machine which might otherwise occur. In other types of machines which utilize the principles discussed herein, other types of sensors and arrangements may be used to detect the presence and proper positioning of one or more work pieces that are machined through operation of the machine and the various components thereof.

Exemplary machines of various embodiments may include other or additional features. Such features may include those described in any of the following U.S. Patent Nos. each of which is incorporated herein by reference in their entirety: U.S. Pat. Nos. 5,730,037; 6,050,162; 6,148,976; 6,626,072; and 6,848,347.

In the exemplary embodiment a machine operator or skilled setup person operates to initially configure the machine to make the type of parts that are to be manufactured. During setup, cutting tools are positioned to appropriately engage work pieces carried by the different spindles in each of the stations other than the feed-in station. Such cutting tools may be positioned on appropriate slides or other mechanisms that have controlled movement so as to engage the work pieces at the appropriate times, positions, angles and speeds so that the work pieces may properly undergo machining. During setup the controller enables manual control and jogging of the motors and clutches as appropriate to selectively move the actuators which cause movement of the tools and work pieces so as to allow setup and make the appropriate adjustments. During setup sample work pieces will also be run for testing the positioning and adjustment of the cutting tools, cam positions, sensor positions, actuator speeds, actuator positions, machining speeds and other settings so as to assure that they are appropriate.

Numerous sample parts will also often be run and tested to assure that the machine is set up appropriately.

In exemplary arrangements the setup process also involves programming of the controller in a manner like that described in the incorporated disclosure to achieve the optimum cycle time for the machine. This will include, for example, in a multi-spindle machine setting the parameters for when the controller engages and disengages the high and low speed clutches during operation. This will include in exemplary arrangements determining the position of the timing shaft when the work pieces in the stations have all undergone completed machining while the spindles and other machine components are operating in response to power that is transferred through the low speed clutch. Once the work pieces in the different stations have undergone their respective machining operations, the exemplary controller can then disengage the low speed clutch and engage the high speed clutch so that the components of the machine may move more rapidly. This is the high speed machine cycle portion. The controller causes the high speed clutch to move the machine components more rapidly for purposes of withdrawing the tools from the areas of the work pieces and rotating the main drum so that the spindles each index to the next successive station.

Figure 4:
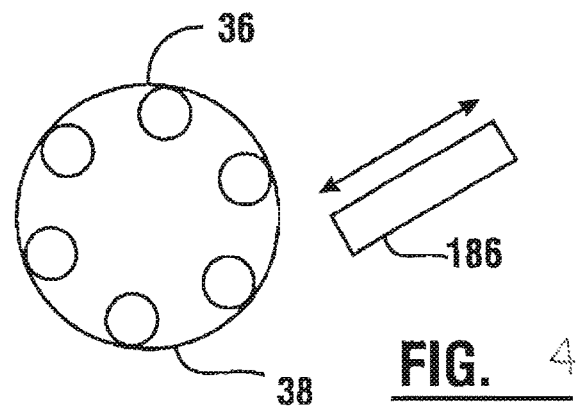
FIG. 4 is a schematic view of a main drum of a multi-spindle machine and an adjacent movable tool holding slide.

Once the drum has indexed, the exemplary controller operates in accordance with its programming to disengage the high speed clutch 16 and again engage the low speed clutch 18. The actuators cause tool movement relative to the work pieces at the respective work stations so that the tools engage the work pieces so that the work pieces undergo machining. This is the low speed machine cycle portion. As shown in FIG. 4 in the exemplary arrangement, the clutches are engaged and disengaged in response to the application and release of fluid pressure through electrically actuated solenoid valves 178 and 180. Of course it should be understood that these types of control valves are exemplary and in other arrangements other types of machine and clutch control arrangements may be used.

In the exemplary embodiment the controller includes input devices such as button input switches 182 and 184 which can be manually actuated by a machine setup person. In the exemplary arrangement manual inputs received through button switches 182 and 184 are operative to adjust the high/low shift point. This is the point during the machine cycle when the controller operates to cause the low speed clutch to disengage and the high speed clutch to engage and vice versa. By adjusting the shift points, the operator is enabled to obtain the most effective machine operation and minimum cycle times. Further in exemplary embodiments the controller may operate other devices to facilitate control over machine components. This may include for example the controller causing the clutch brake 22 or other devices to engage or disengage at selected various times so as to facilitate controlling the speed of the various machine components. Of course it should be understood that these approaches are exemplary and in other arrangements other approaches may be used.

Figure 2:
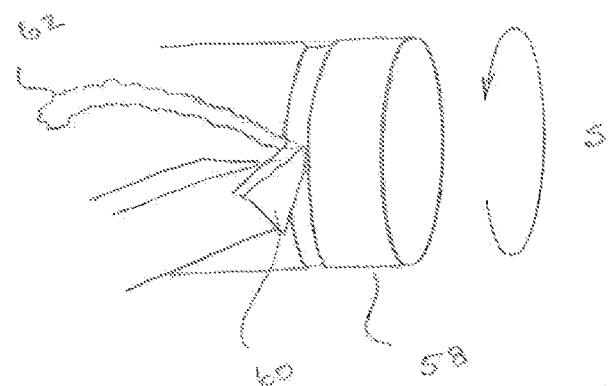
FIG. 2 is an isometric partial view of a work piece in engagement with a cutting tool so as to form a cutting chip.

As can be appreciated in operation of machine 10, the cutting tools are movably positioned adjacent to work pieces in the various work stations by actuators to accomplish the desired machining operations. This may include, for example, cutting tools which can remove metal to reduce the diameter of bar stock to a desired size or cut grooves or other desired contours into the work pieces. This is represented in FIG. 2 by a work piece 58. The work piece is rotated in engagement with a corresponding spindle as represented by Arrow S. A cutting tool 60 includes a cutting edge which is moved to engage the surface of the work piece in a direction generally transverse to the rotational direction of movement of the work piece. In some arrangements the cutting tool may be mounted on a selectively movable slide such as the slide 186 shown in FIG. 4. The cutting tool is moved on the slide by an actuator that is in operative connection with the controller. As the cutting edge of the tool engages the work piece, metal is separated from the work piece forming chips. This is represented by a chip 62 shown in FIG. 2.

Figure 3:
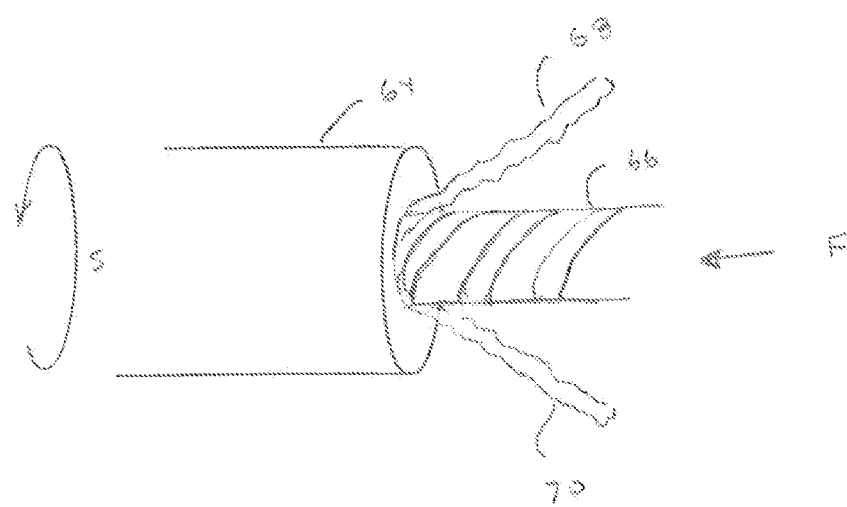
FIG. 3 is an isometric partial view showing a metal work piece in engagement with a drill forming chips from the cutting action thereof.

An alternative machining operation is represented in FIG. 3 where a work piece 64 has an opening drilled in an axial end thereof by a drill 66. Drill 66 is fed axially inward in the direction of Arrow F in a direction coaxial with the rotational axis of the work piece to form the hole in the work piece. Once the hole is formed, the drill is axially moved so it is withdrawn from the hole through operation of an actuator of the machine. As represented in FIG. 3, the drilling action and the cutting edges on the drill also produce chips represented 68 and 70. Suitable actuators for moving tools relative to work pieces may include for example, motors, solenoids, cylinders, rotary actuators, servo motors, or other devices that can provide controlled tool movement.

Figure 11:
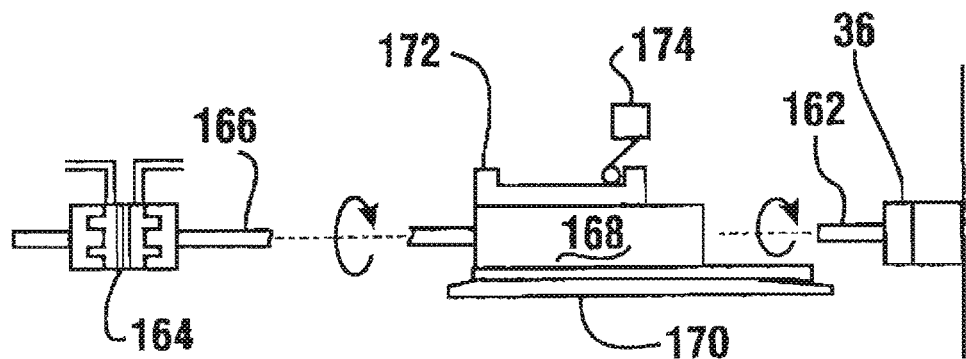
FIGS. 11, 12 and 13 are schematic views representing a threading spindle and tool slide which are operated in connection with a threading clutch used to thread a work piece.
Figure 12:
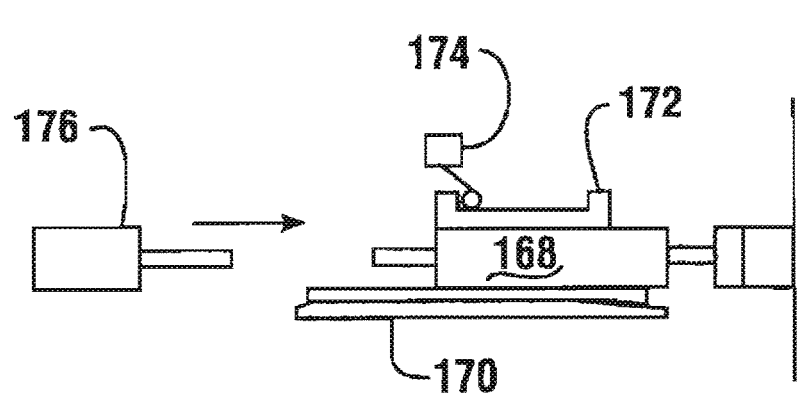
Figure 13:
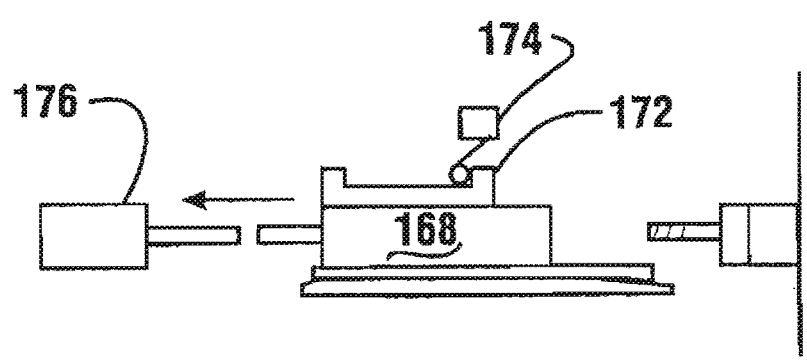

Other machining operations which are conducted in exemplary multi-spindle machines are represented in FIGS. 11-13. As represented in FIG. 11, the work piece 162 is held in engagement with a spindle 36. The work piece is held via a collet or other similar mechanism which is part of the spindle that can hold the work piece and selectively release it when it is desired to feed additional bar stock or for other purposes. The spindle rotates the work piece 162 as shown. A threading clutch assembly 164 is used to have the work piece undergo a threading operation. In the exemplary arrangement the threading clutch assembly includes a pair of clutches each of which may be selectively connected to gears that operate at different speeds. Depending on which of the clutches in the clutch assembly is engaged at a given time, the threading clutch output shaft 166 will rotate in the same direction as the stock piece 162 but either at a slower or faster rate relative thereto. As can be appreciated by selectively engaging the threading clutches, a cutting tool in the form of a threading tool which is rotated in response to the output shaft 166 can be moved by one or more actuators and operated to produce either right-hand or left-hand threads on the stock piece 162. This is accomplished by rotating the threading tool at a speed either slower or faster than the stock piece. Similarly by changing the engaged threading clutch, the threading tool can be backed off of the stock piece once the threads have been formed thereon.

The threading process is represented in FIGS. 11-13 in which a threading tool 168 is schematically illustrated and is guided on a tool slide 170. A switch actuator 172 is in operative connection with the threading tool 168. The threading tool is shown in its fully retracted position away from the work piece in FIG. 11. In this position a switch lever operatively connected to the tool slide engages a switch 174 so as to indicate to the controller 42 that the threading tool at this particular machining station is in a fully retracted position.

While the machine operates the threading tool 168 is moved to engage the work piece 162 by guided movement on the slide. This is accomplished using an actuator such as a pneumatic cylinder 176 which is schematically shown. Alternatively the threading tool may be moved responsive to a servo motor, a cam of the machine or other suitable actuating device. As the threading tool moves to engage the work piece, threads are formed thereon. The threading tool moves axially inward until the switch 174 is moved to the fully forward full stroke position by the switch lever 172 as represented in FIG. 12.

Once the threading tool 168 has been moved to the fully forward position, the cylinder 176 is controlled responsive to the controller to change direction. This causes the threading tool to return to its original position in which the switch lever 172 engages the switch 174 to indicate that the switch is again in its fully retracted position. Once fully retracted, the threading operation is complete and the threading tool is sufficiently disposed away from the work piece so that the controller may shift from the machine being moved responsive to the low speed clutch to having the machine components operated responsive to the high speed clutch which causes the drum and other components to move more quickly so that work pieces may more quickly reach the next station and again begin to undergo machining.

As can be appreciated, exemplary machines may include any number of different types of cutting tools such as drills, threading tools, cutting bits and the like in the different stations so as to carry out machining functions on the work pieces. As will be appreciated by those skilled in the art, such cutting tools when engaged with the work pieces, produce metal chips. The metal chips are comprised of the metal that separates from the work pieces through action of the cutting tools.

Certain types of metals and cutting tools produce chips that can be problematic for multi-spindle machines and other types of machining devices. This is particularly true of materials which are relatively soft and ductile. An example of such a material is aluminum 6061 which has been known to produce long stringy chips. Such long continuous chips can cause problems. They can produce twisted mats of material that jam machine parts and tools. Such chips may even break equipment, tool slides or harm cutting surfaces and work pieces. Such chips if not controlled may require operator intervention to clear accumulated chips, or make machines inoperative and result in down time for repairs.

Figure 6:
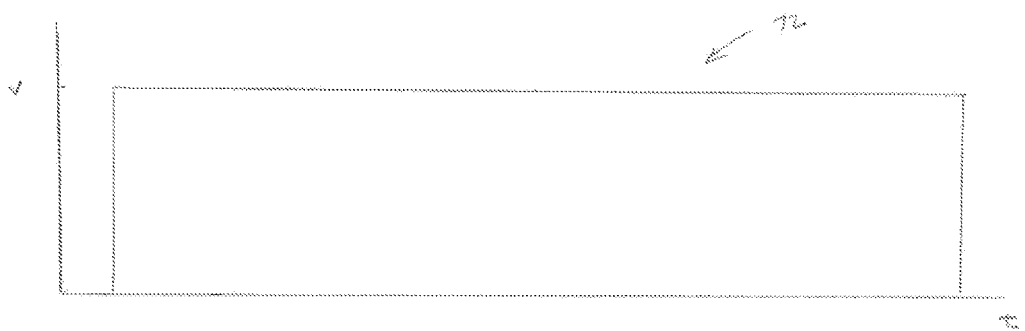
FIG. 6 is a schematic view of a portion of a control signal output from an exemplary controller in which no periods of disengagement of the low speed clutch are provided.

In exemplary arrangements of the control system, when certain types of work pieces and materials are employed, the formation of chips may not be an issue. The properties of the cutting tools, the machine coolant and the material may be such that the chips formed are relatively short discrete pieces of metal. Such material will migrate away from the point of engagement of the tool and the work pieces and not cause any potential problems. For such operation, a controller of an exemplary embodiment may operate the low speed clutch in continuous engagement during the low speed portion of the machine cycle. Such continuous engagement of a low speed clutch is represented by the signal 72 shown in FIG. 6. Signal 72 represents a condition where the controller produces outputs which cause the solenoid valve which actuates the low speed clutch to keep the clutch continuously engaged throughout the low speed portion of the machine cycle. In response to such a signal, the low speed clutch causes the machine to drive the rotating work pieces and tools in a generally continuous manner so as to cause the work pieces to undergo machining.

In exemplary embodiments, the one or more data stores 49 may include machining data that is associated with particular machining activities which corresponds to the continuous engagement of the low speed clutch during the low speed portion of the machine cycle. Such machining data may be stored in association with data corresponding to work piece material, cutting tool type, work piece type, part number or other parameters which identify the particular work piece or machining activity as one that is associated with such continuous low speed clutch engagement during the machining portion of the machine cycle.

In exemplary arrangements the controller is configured to enable the machine operator to provide inputs so as to select the machining data that corresponds to the parameters which are best suited to the machining cycle for the particular work pieces to be machined. Thus for example the operator may provide inputs which are operative to select the desired machining data. This may be done, for example, by inputting the data through a keypad or other similar input devices on or connected to the controller. Alternatively such data may be downloaded from a remote computer such as a central work station. This may include, for example, a work station 188 like that schematically represented in FIG. 14. For example machining data may be stored in one or more databases 190 in operative connection with processor circuitry of the work station 188 and selectively downloaded to the controllers 42 of the particular machines in which the work pieces are to be produced. Of course it should be understood that this approach is exemplary and in other embodiments, other approaches may be used.

In other arrangements for operation of the machine with particular types of materials or work pieces, it is desirable to take steps to avoid undesirable chip formation conditions. In such circumstances it may be desirable to periodically break the continuity of the chips that are formed by the tools so as to avoid excessively long, potentially harmful chip formation. This is accomplished in exemplary embodiments by disengaging the low speed clutch for brief periods during the portion of the machine cycle in which the low speed clutch provides the driving force for the machine components and during which the cutting tools are engaged with the work pieces. Disengaging the low speed clutch for such brief periods causes changes in the applied force of engagement between the tool and work piece, relative speed and/or position of the work pieces and/or tools which causes discontinuity or otherwise changes the chip formation properties.

In exemplary arrangements disengaging the low speed clutch causes pulsing action and stoppage or changes in speed that cause the chip formation action to break chip continuity. This results from various factors including the pulsing action from the engagement and disengagement of the clutch and the lash of the gears and cams and cam followers of the machine. In some exemplary situations such clutch disengagement changes the velocity of cutting tools moved on tool slides by actuators to stop or change the rate of feed of the tool relative to the work piece. In exemplary arrangements the timing and duration of the periods of the disengagement of the low speed clutch are configured to break the continuity of chip formation at appropriate times during the low speed portion of the machine cycle when machining is occurring. Further because work pieces undergo machining generally concurrently in multiple work stations, in some arrangements periods of disengagement and the duration of such disengagement may be configured to achieve chip discontinuity in different stations where work pieces are undergoing different machining processes.

In exemplary embodiments periods of disengagement are controlled by the machine controller responsive to machining data stored in the at least one data store. The machining data causes the timing and duration of the periods of disengagement of the low speed clutch to be the same in every cycle of the machine. This helps to assure that chip discontinuity is achieved in generally a uniform manner during each machine cycle. Further in exemplary arrangements the machining data which is used through operation of the controller to control the engagement and disengagement of the low speed clutch is associated with selectable criteria such as the work piece material, cutting tool type, and work piece type such as a part number, etc. that an operator can select or otherwise input when setting up the machine.

Figure 7:
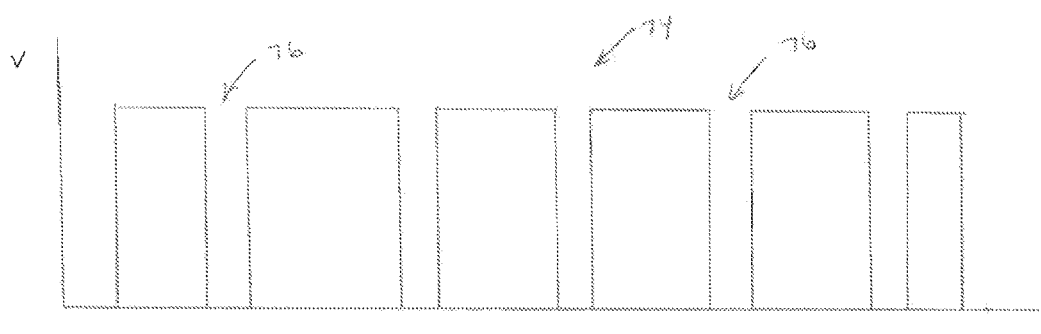
FIG. 7 is a schematic view of a portion of a signal similar to FIG. 6 which represents the timing of the disengagement periods being varied.

FIG. 7 shows an exemplary signal 74 output from an exemplary controller to control engagement and disengagement of the low speed clutch during the low speed portion of the machine cycle. Like previously described signal 72, the exemplary signal 74 is a signal output from the controller to control the solenoid valve which engages and disengages the low speed clutch. As represented in FIG. 7, signal 74 includes periods of disengagement 76. As represented in FIG. 7, the timing of these periods of disengagement 76 is varied so as to break the continuity of the chips that are generated by tool engagement with the work pieces. In this exemplary signal 74 the duration of the periods is generally the same while the timing between periods is varied somewhat. The particular machining data which causes the controller to output signal 74 is tailored to the particular work piece being produced.

Figure 8:
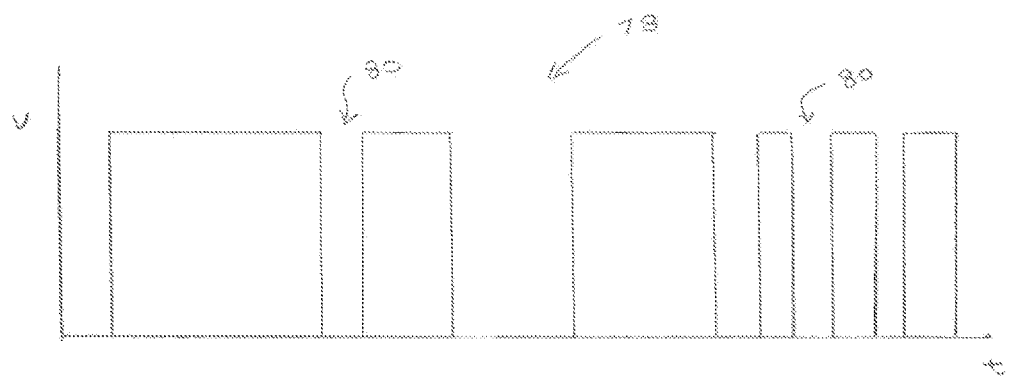
FIG. 8 is another schematic view of a portion of a signal similar to FIG. 6 which represents the timing and duration of the disengagement periods of the low speed clutch being varied.

FIG. 8 shows an alternative signal 78 for controlling engagement of the low speed clutch during the low speed portion of the machine cycle. As can be appreciated signal 78 is generated as the controller varies the timing and duration of the various periods of disengagement 80 of the low speed clutch during the machining operations. The exemplary signal 78 is configured for the particular type of material, part and cutting tools utilized for this particular machine operation. The machining data stored in the at least one data store 49 of the controller is associated with the particular identifying data which can be input to cause the machine to vary the patterns of engagement and disengagement of the low speed clutch in this manner. Of course it should be understood that FIGS. 7 and 8 are representative of signal types that produce periods of disengagement which are examples suitable for certain types of parts, tools and materials. Numerous different types of disengagement patterns and periods may be utilized depending on the particular parts and machining operations which are to be performed.

Figure 9:
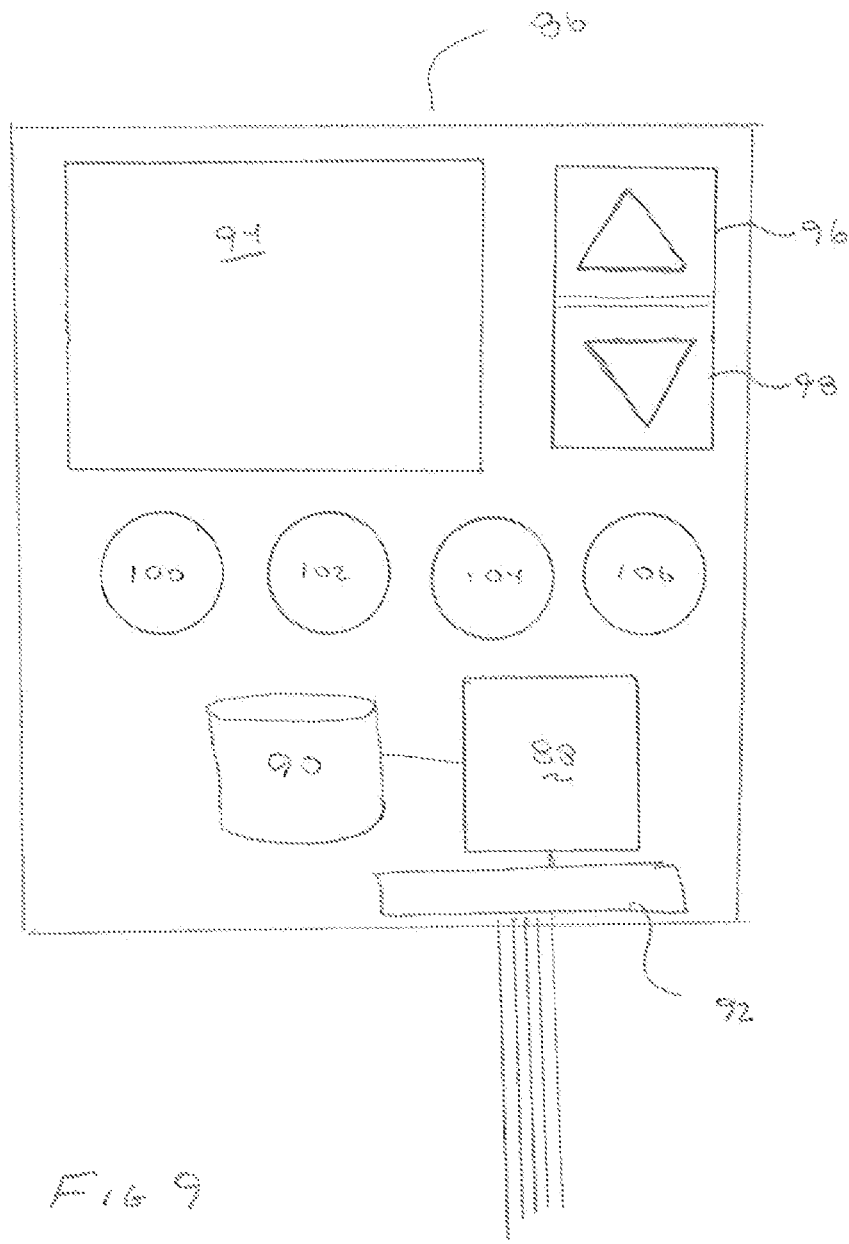
FIG. 9 is a schematic view of an alternative exemplary embodiment of a controller for a multi-spindle machine.

FIG. 9 is a schematic view of an alternative machine controller 86. Machine controller 86 is generally similar to controller 42 except as otherwise described. Controller 86 includes one or more circuits 88 which include a processor of the type previously described and which are in operative connection with one or more data stores 90. The data stores may include data and computer executable instructions which cause operation of the controller and the machine in selectively programmed and controlled manners like those previously discussed. Data stores 90 may also include the machining data and associated identifying data that enables the machining data to be used to control operation of the machine in response to inputs such as inputs that identify work piece material, cutting tool type, work piece type such as part numbers, as well as combinations thereof.

The exemplary controller 86 includes one or more interfaces 92. Interfaces 92 may include hardware and software interfaces suitable for communicating with sensors, devices and other components to which the controller may be in operative connection. The exemplary controller 86 further includes input and output devices. Such devices may include a display 94. Display 94 of exemplary embodiments may include an input device as well as a touch screen display which enables an operator to provide alphanumerical or other types of inputs. Other input devices may include button switches such as manual input buttons 96 and 98. Buttons 96 and 98 may be used for adjusting parameters up and down such as machine shift points or other similar parameters. Other buttons such as button switches 100, 102, 104 and 106 or other manual input devices may be used to provide controller inputs so that an operator may provide selective control inputs to the machine. Of course it should be understood that numerous different types of manual input devices may be used, and may include for example, switches, turnable knobs, depressable buttons, haptic type input devices or other suitable manual or electronic input devices for providing inputs to the controller for purposes of controlling the machine.

In exemplary arrangements the machine operator may utilize the controller to develop and store machining data which can be stored in the controller and used on an ongoing basis to produce work pieces of a particular type. Specifically the operator may provide inputs so as to establish computer executable instructions corresponding to patterns for the timing and duration of periods for disengagement of a low speed clutch during the low speed portion of the machine cycle so as to break the continuity of the chips during machining in the most effective manner as observed by the operator. In exemplary arrangements the operator can store the instructions corresponding to machining data in association with identifying data for the material, tool type, part type, etc. such that such machining data can be utilized not only in the current manufacturing run, but also in the manufacturing of work pieces of that particular type in future production activities.

Figure 10:
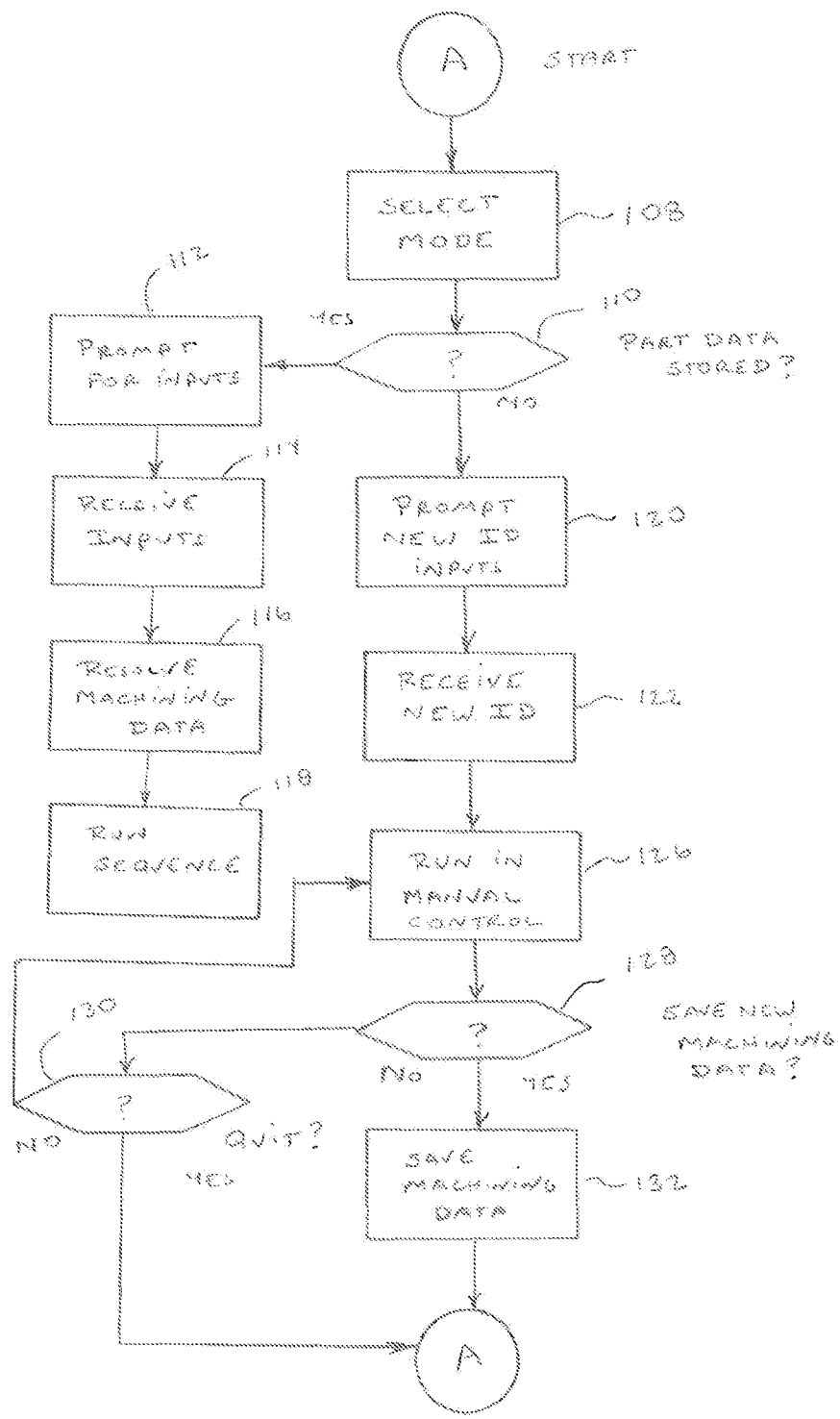
FIG. 10 is a schematic of exemplary logic flow associated with a portion of the operation of an exemplary controller associated with storing and utilizing machining data.

In exemplary arrangements the controller may operate to execute the logic represented in FIG. 10 in connection with setting up the machine to produce particular parts. It should be appreciated that the logic flow schematically represented in FIG. 10 is only a small portion of the logic flow carried out by operation of the controller and is a simplified version of logic flow associated with the machine setup. For example as discussed in the incorporated disclosures, setting up the machine will involve the adjustment of numerous different components and devices.

During the setup functions carried out for the machine, the setup person will eventually reach the point where they wish to run sample parts. This point is generally reached after all of the cutting tools have been appropriately positioned and the devices which control the movement of those tools during the machine cycle have been set to provide the precise range of movement necessary for carrying out the machining that will form the work pieces into the parts. The setup person will then provide inputs to the controller to select the particular mode for operation of the machine. The selection of the mode corresponds in this exemplary embodiment to the setup person providing an indication of whether the part to be made is one where its machining data is already stored in connection with the machine controller or is alternatively a part for which machining data needs to be developed. The setup person is prompted to provide this data as represented in a step 108. The controller then operates in accordance with its programming to determine if the user input indicates that the user desires to produce a part for which machining data is already stored or whether new data will be input. This is represented in a step 110.

If the part is one for which data already exists, the circuitry 88 of the controller operates in accordance with its programming to provide prompts to the user as represented in a step 112. The prompts in exemplary embodiments include prompts for inputs which can be correlated with the machining data which is stored in the one or more data stores in connection with the controller. Such data inputs may include data corresponding to the work piece material that is to be machined. It may also include the particular cutting tool type or types or tool properties which will be utilized in connection with machining the work pieces. The data prompted to be input may also include information concerning the work piece type. The work piece type data may include various work piece characteristic or identifying information such as part numbers or other characteristics. In some exemplary arrangements, the controller may prompt a user to provide numerous items of information of this type in order to resolve the appropriate machining data from the data stored in one or more data stores.

As represented in a step 114 the controller receives the user inputs. In response to the prompted user inputs, the controller operates in accordance with its programming to resolve the machining data from the data that is stored in the data store as represented in a step 116. As previously discussed, the machining data includes data that corresponds to the timing and duration of the periods during which the low speed clutch is disengaged during the low speed portion of the machine cycle.

In addition, in exemplary embodiments resolved machining data may correspond to other data which is used in connection with operation of the machine. For example in some arrangements data such as the shift points between engagement of the high speed clutch and the low speed clutch may be stored in correlated relation with the machining data and recovered through operation of the controller. Further other data may be stored in the at least one data store. This may include, for example, feeding profiles for pneumatic or servo actuators that move tool slides. For example in some arrangements the pneumatic or servo actuators may be operated in a controlled manner to feed at particular rates or in particular steps when cutting tools are engaged with work pieces. This may include for example controlling speeds and the length of steps for the movement of cutting tools.

The machining data may also include data usable for controlling the movement of cutting tools so as to break the continuity of chips or control chip size. For example in some arrangements cutting tool movement controlled responsive to an actuator may be moved in a first direction to cut the work piece for a particular time or distance, and then movement in the first direction may be stopped so as to break chip continuity or otherwise control the size of the chip. Thereafter the tool may then be advanced in the first direction further and then again stopped for a brief period. Such approaches may be used not only to control chip size but also other parameters such as temperatures, relative speed of the cutting surface of the tool compared to the surface of the work piece and other items. The repeated advance and stopping of the tool by the actuator will operate to cause chip formation discontinuities in a desired manner. Alternatively other types of speed changes which may not include stopping movement of the tool in the first direction relative to the work piece can control chip size and properties. Data usable for the control of the various actuators which move the tools in directions relative to the work pieces may be stored as part of the machining data. Various types of data may be stored in the one or more data stores and associated with the identifying inputs so as to provide machining data which is utilized by the controller in producing the particular type of part through operation of the machine.

Once the machining data and other data has been resolved by the controller in step 116, the exemplary controller then moves into a run sequence as represented by a step 118. The run sequence may be of various automatic or semiautomatic types of actions so as to cause the machine to operate. In some arrangements the machine operator may control the initial machine operation so as to produce sample parts and once the sample parts are produced, the run sequence may enable the machine to operate in a fully automated manner for continuous part production until an event which causes the controller to cease the continuation operation occurs. This might be for example an adverse event such as is discussed in the incorporated disclosures which may correspond to a malfunction. Of course various approaches to the run sequence may be utilized depending on the particular machine and the programming of the particular controller.

Returning to a discussion of the logic flow, if in step 108 the setup person has indicated that there is no data stored for the particular part to be manufactured, the exemplary controller operates in accordance with its programming to prompt the user to input through the input devices, new identifying inputs for association with the particular part. As previously discussed this may include one or more different types of inputs. It may include factors such as work piece material, cutting tool information, work piece types including part numbers or other identifying data as well as other information that may be appropriate to identify the particular work piece and/or machine operating parameters under which the machine is to operate. The prompting of the input of this data is represented in a step 120.

From step 120 the controller operates to receive the identifying data through manual inputs or other inputs to the input devices as represented in a step 122. The controller then operates to cause the machine to commence operation in a manual control sequence. In the exemplary embodiment the machine operates to begin forming work pieces subject to manual control. Such manual control may include the operator providing inputs which cause the disengagement of the low speed clutch for periods during the machining operations. This may also include providing manual inputs that control the speed, direction, stop intervals and other operations of actuators that move the tools relative to the work pieces in other than the rotational direction of movement caused by the spindle with which the work piece is engaged. This may be done, for example, by the operator providing inputs through button switches or other input devices so as to provide periods of disengagement of the low speed clutch and/or speed and movement control of one or more tool moving actuators. This operation of the machine through one or more cycles under manual control is represented in a step 126.

In some exemplary arrangements the manual control may be carried out for a single machine cycle. In still other arrangements, the machine may be operated for multiple cycles and during each cycle the operator may provide inputs so as to control the periods of disengagement of the low speed clutch. In some exemplary arrangements the machine may operate through numerous cycles during which inputs are received so as to vary the timing and duration of the periods of disengagement of the low speed clutch. Generally the operator will refine the timing and duration of such periods to break the continuity of chips in the desired manner as observed by the operator during the machining of the work pieces. Through the multiple machine cycles, the operator can provide inputs which through observation achieve the most desirable timing and duration for such disengagement periods. In addition to controlling the engaged status of the low speed clutch, in some arrangements the machine operator may control other parameters manually. This may include for example the actuators that control movement and speed of tools, tool slides or other tool actions independent of the low speed clutch.

Once the operator has found a desirable pattern for disengaging the low speed clutch, and/or other components of the machine, the operator is prompted through operation of the controller to advise whether they wish to store data corresponding to the timing and duration of disengagement (as well as other control data) for the most recent pattern as machining data in the data store of the controller. This is represented in a step 128.

If the operator has not been satisfied with the results of the prior manual control, they may provide an indication thereof which prompts the machine operator to indicate whether they wish to continue to try refining the patterns of timing and periods of disengagement by providing manual inputs through one or more additional cycles. This is represented in a step 130. If the operator does not want to quit the process of operating the machine under manual control, such control is continued through step 126. If the user decides to quit at step 130, then the logic returns to the initial starting point.

Alternatively, if in step 128 the operator feels that they have developed an approach for the timing and duration of the periods of disengagement (or other control data) that is satisfactory, an affirmative input causes data corresponding thereto to be stored as machining data in the data store of the controller. This is represented by a step 132. In exemplary arrangements the storage of the data may correspond to the timing and duration for the periods of disengagement as input manually during the final machine cycle. Alternatively in other arrangements machining data may correspond to the manual inputs over several prior cycles, with the timing and duration data averaged or otherwise conformed through programmed operation of the controller to a single set of machining data. Different approaches may be taken depending on the particular programming of the controller for receiving such manual control inputs.

Once the setup person has stored what they believe is suitable machining data in the at least one data store, they may then operate the machine to recover that data and control the machine in response thereto. If the setup person finds the data to be satisfactory in breaking the continuity of the chips and/or in controlling the machine parameters in accordance therewith, they can allow the data to remain as the stored data for that particular manufacturing operation. Alternatively if the machine data requires further refinement, the existing data may be cleared and the manual input process repeated so as to provide suitable machining data in the data store for use in making the part.

Figure 14:
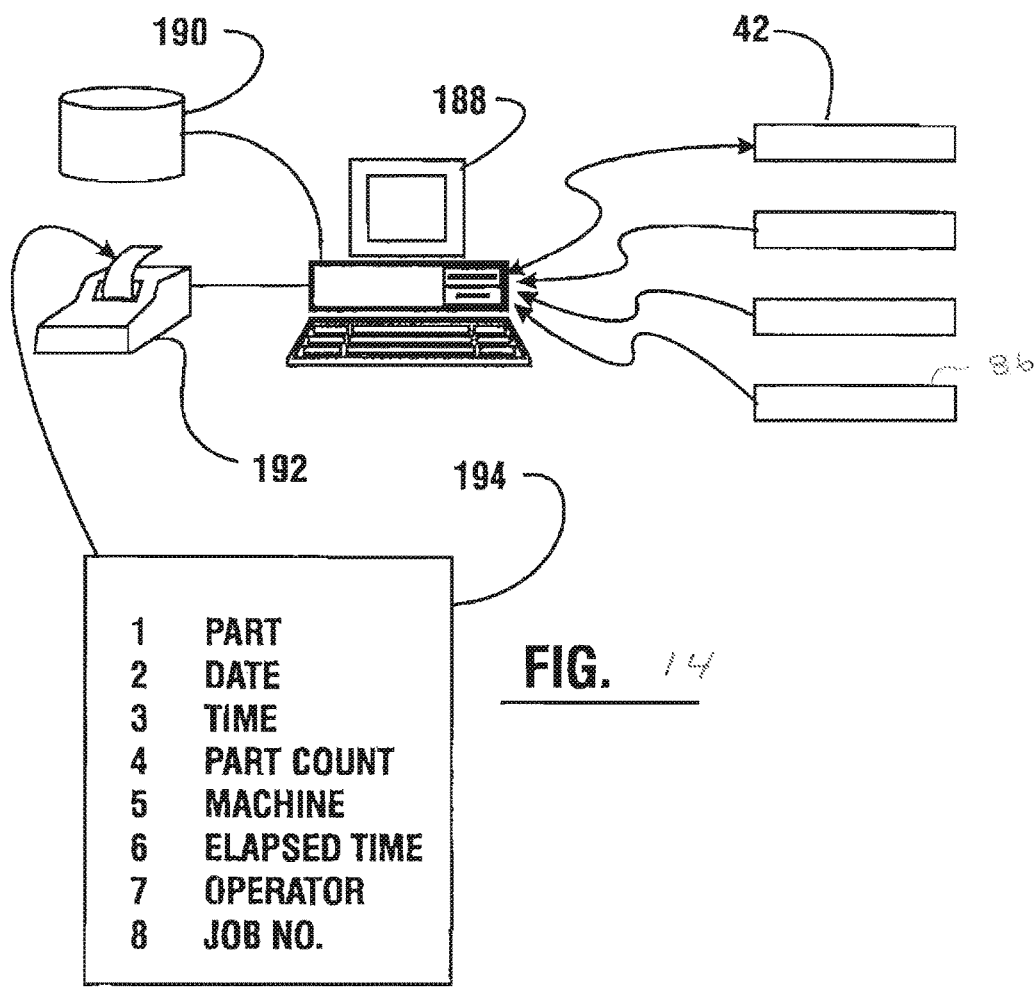
FIG. 14 is a schematic view of a work station used in connection with controllers on several multi-spindle machines.

Once the machining data and other operating parameters have been set, they may remain stored in memory of the controller 86. Alternatively as represented in FIG. 14, such data may be uploaded to a remote computer such as work station 188 which is in operative connection with numerous different multi-spindle machines of the manufacturing operation. The machining data may be stored in connection with the part or other identifying data in the database 190. In exemplary arrangements the computer 188 may enable this data to be recovered and downloaded to different machines that may be utilized for purposes of producing the same part. This avoids the need for machine setup people to manually develop machining data at each multi-spindle machine. Alternatively or in addition the work station 188 may include programming in the form of processor executable instructions that enables the circuitry of the work station to be operated to modify or normalize the machining data so as to change it in a manner determined to produce better parts based on the experience achieved in operating the different multi-spindle machines. Alternatively or in addition the circuitry of the work station may be programmed to translate or modify the data so it can be used with different brands or types of machines. The exemplary work station 188 may also be operatively connected to other work stations or other processor containing circuitry in the same facility or different facility for purposes of comparing and resolving suitable manufacturing data and other data for controlling the machines. In addition, exemplary work stations may be in operative connection with output devices such as printers, graphic plotters and the like, represented 192. Further exemplary work stations may be usable to produce reports or other outputs either in physical or electronic form to provide information on the operation of the machines as well as setup data and information about machining data that is utilized in connection with the operation of the particular machine which produces the particular part. Numerous forms of statistical data may thereby be developed and analyzed for purposes of achieving desirable operation of the machines. Of course numerous different variations and approaches may be utilized depending on the particular circumstances in which the components are being produced.

Thus the new machine control system of exemplary embodiments achieves at least some of the above stated objectives, eliminates difficulties encountered in the use of prior devices and systems, solves problems and attains the desirable results described herein.

In the foregoing description, certain terms have been used for brevity, clarity and understanding. However, no unnecessary limitations are to be implied therefrom because such terms are for descriptive purposes and are intended to be broadly construed. Moreover the descriptions and illustrations herein are by way of examples and the new and useful features are not limited to the details shown and described.

Further in the following claims any feature that is described as a means for performing a function shall be construed as encompassing any means capable of performing that function known to those having skill in the art, and shall not be deemed limited to the particular means shown in the foregoing description or mere equivalents thereof.

It should be understood that language which refers to a list of items such as "at least one of A, B or C" (Example 1), means "at least one of A, B and/or C." Likewise it should be understood that language which refers to a list of items such as "at least one of A, B, and C" (Example 2) means "at least one of A, B and/or C." The list of items in Example 2 is not required to include one of each item. The list of items in both Examples 1 and 2 can mean "only one item from the list of any combination of items in the list." That is, the lists of items (in both Examples 1 and 2) can mean only A, or only B, or only C, or any combination of A, B, and C (e.g., AB, AC, BC, or ABC).

The term "nontransitory" with regard to computer readable medium or data store is intended to exclude only the subject matter of a transitory signal, per se, where the medium itself is transitory. The term "nontransitory" is not intended to exclude any other form of computer readable media, including media comprising data that is only temporarily stored or stored in a transitory fashion.

Having described the features, discoveries and principles of the described exemplary embodiments, the manner in which they are constructed and operated, and the advantages and useful results attained; the new and useful structures, devices, elements, arrangements, parts, combinations, systems, equipment, operations, methods, processes and relationships are set forth in the appended claims.

I claim:

1. Apparatus comprising:
   a multi-spindle machine including a plurality of rotatable spindles,
   wherein each spindle is configured to hold and rotate a metal work piece,
   wherein the machine is configured to move each spindle and engaged work piece to a plurality of disposed stations,
   wherein the machine is configured to cause work pieces in a plurality of the disposed stations to undergo machining generally concurrently,
   a metal cutting tool movably positioned adjacent to a tool station,
   wherein the tool is movable to engage a work piece at the tool station,
   wherein tool engagement with the work piece during machining produces metal chips,
   a high speed fluid actuated clutch,
   a low speed fluid actuated clutch,
   at least one electrically actuated fluid control valve,
   wherein the at least one fluid control valve is in operative connection with the high speed clutch and the low speed clutch,
   wherein the at least one fluid control valve is selectively operative to cause fluid pressure to be applied to and removed from the high speed clutch and the low speed clutch,
   wherein the application of fluid pressure to a respective clutch causes the respective clutch to be engaged and the removal of fluid pressure causes the respective clutch to be disengaged,
   a controller,
   wherein the controller includes circuitry specifically adapted for machine control and which includes at least one processor and at least one data store,
   wherein the controller is in operative connection with the at least one fluid control valve,
   wherein the controller is configured to cause
   the high speed clutch to be engaged during a high speed portion of a machine cycle when the spindles are moving between stations,
   the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining,
   the low speed clutch to disengage for brief predetermined periods during the low speed portion of the machine cycle while the tool engaged work piece at the tool station undergoes machining,
   wherein the disengagement of the low speed clutch for the periods breaks the continuity of chips generated by tool engagement with work pieces at the tool station.

2. The apparatus according to claim 1
   wherein the controller is operative to cause variation of at least one of timing and duration of the periods of disengagement.

3. The apparatus according to claim 2
   wherein the controller is operative to cause variation of both timing and duration of the periods of disengagement.

4. The apparatus according to claim 2
   wherein the controller is operative to cause variation of at least one of timing and duration of the periods of disengagement, responsive at least in part to machining data stored in the at least one data store.

5. Apparatus usable in connection with a multi-spindle machine including a plurality of rotatable spindles,
   wherein each spindle is configured to hold and rotate a metal work piece,
   wherein the machine is configured to move each spindle and engaged work piece to a plurality of disposed stations,
   wherein the machine is configured to cause work pieces in a plurality of the disposed stations to rotate and undergo machining generally concurrently,
   a metal cutting tool movably positioned adjacent to a first station,
   wherein the tool is movable to engage a work piece at the first station, and tool engagement with the work piece during machining produces metal chips,
   a high speed fluid actuated clutch,
   a low speed fluid actuated clutch,
   at least one electrically actuated fluid control valve,
   wherein the at least one fluid control valve is in operative connection with the high speed clutch and the low speed clutch,
   wherein the at least one fluid control valve is selectively operative to cause fluid pressure to be applied to and removed from the high speed clutch and the low speed clutch,
   wherein the application of fluid pressure to a respective clutch causes the respective clutch to be engaged and the removal of fluid pressure causes the respective clutch to be disengaged,
   the apparatus comprising a controller including circuitry specifically configured for control of the multi-spindle machine and which includes at least one processor and at least one data store,
   wherein the controller is configured to be in operative connection with the at least one fluid control valve,
   wherein the controller is configured to cause
   the high speed clutch to be engaged during a high speed portion of a machine cycle when the spindles are moving between stations,
   the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining,
   the low speed clutch to disengage for brief predetermined periods during a low speed portion of the machine cycle while the tool engaged work piece at the first station undergoes machining,
   wherein the disengagement of the low speed clutch for the periods breaks continuity of chips generated by tool engagement with the work piece at the first station.

6. The apparatus according to claim 5 wherein the multi-spindle machine further includes a tool actuator in operative connection with the tool, wherein the tool actuator is operative to cause the tool to move relative to the work piece at the first station during machining along a direction other than a rotational direction,
   wherein the controller is configured to be in operative connection with the tool actuator, and the controller is configured to control tool speed along the direction relative to the work piece during machining.

7. The apparatus according to claim 5
wherein the data store includes stored machining data,
wherein the stored machining data corresponds to timing and duration of the periods of disengagement,
and further including at least one input device, wherein the at least one input device is useable to select stored machining data,
wherein the controller is operative responsive at least in part to the selected machining data to control the timing and duration of the periods of disengagement.

8. The apparatus according to claim 7
wherein the at least one input device is useable to select machining data responsive to identifying inputs,
wherein the identifying inputs correspond to at least one of work piece material, cutting tool type and work piece type.

9. The apparatus according to claim 8
wherein the at least one identifying input corresponding to work piece type includes a part number.

10. Apparatus comprising:
a multi-spindle machine including a plurality of rotatable spindles,
  wherein each spindle is configured to hold and rotate a metal work piece,
  wherein the machine is configured to move each spindle and engaged work piece to a plurality of disposed stations,
  wherein the machine is configured to cause work pieces in a plurality of the disposed stations to undergo machining generally concurrently,
a metal cutting tool movably positioned adjacent to a tool station,
  wherein the tool is movable to engage a work piece at the tool station,
  wherein tool engagement with the work piece during machining produces metal chips,
a high speed fluid actuated clutch,
a low speed fluid actuated clutch,
at least one electrically actuated fluid control valve,
  wherein the at least one fluid control valve is in operative connection with the high speed clutch and the low speed clutch,
  wherein the at least one fluid control valve is selectively operative to cause fluid pressure to be applied to and removed from the high speed clutch and the low speed clutch,
  wherein the application of fluid pressure to a respective clutch causes the respective clutch to be engaged and the removal of fluid pressure causes the respective clutch to be disengaged,
a controller,
  wherein the controller includes circuitry specifically adapted for machine control and which includes at least one processor and at least one data store,
  wherein the controller is in operative connection with the at least one fluid control valve,
wherein the controller is configured to cause
  the high speed clutch to be engaged during a high speed portion of a machine cycle when the spindles are moving between stations,
  the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining,
  the low speed clutch to disengage for brief predetermined periods which vary in both timing and duration during the low speed portion of the machine cycle while the tool engaged work piece at the tool station undergoes machining,
wherein the disengagement of the low speed clutch for the periods breaks the continuity of chips generated by tool engagement with the work piece at the tool station.

11. Apparatus comprising:
a multi-spindle machine including a plurality of rotatable spindles,
  wherein each spindle is configured to hold and rotate a metal work piece,
  wherein the machine is configured to move each spindle and engaged work piece to a plurality of disposed stations,
  wherein the machine is configured to cause work pieces in a plurality of the disposed stations to undergo machining generally concurrently,
a metal cutting tool movably positioned adjacent to a tool station,
  wherein the tool is movable to engage a work piece at the tool station,
  wherein tool engagement with the work piece during machining produces metal chips,
a high speed fluid actuated clutch,
a low speed fluid actuated clutch,
at least one electrically actuated fluid control valve,
  wherein the at least one fluid control valve is in operative connection with the high speed clutch and the low speed clutch,
  wherein the at least one fluid control valve is selectively operative to cause fluid pressure to be applied to and removed from the high speed clutch and the low speed clutch,
  wherein the application of fluid pressure to a respective clutch causes the respective clutch to be engaged and the removal of fluid pressure causes the respective clutch to be disengaged,
a controller,
  wherein the controller includes circuitry specifically adapted for machine control and which includes at least one processor and at least one data store,
  wherein the data store includes machining data,
  wherein the controller is in operative connection with the at least one fluid control valve,
wherein the controller is configured to cause
  the high speed clutch to be engaged during a high speed portion of a machine cycle when the spindles are moving between stations,
  the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining,
  the low speed clutch to disengage for brief predetermined periods during the low speed portion of the machine cycle while the tool engaged work piece at the tool station undergoes machining, wherein at least one of timing and duration of the periods of disengagement is varied responsive at least in part to the machining data, wherein the disengagement of the low speed clutch for the periods breaks the continuity of chips generated by tool engagement with the work piece at the tool station.

12. The apparatus according to claim 11
at least one input device, wherein the at least one input device is in operative connection with the controller,
wherein the at least one input device is usable to select stored machining data that causes variation of the at least one of timing and duration of the periods of disengagement.

13. The apparatus according to claim 12
wherein the at least one input device is usable to select machining data responsive to identifying inputs,
wherein the identifying inputs correspond to at least one of work piece material, cutting tool type and work piece type.

14. The apparatus according to claim 13
wherein the at least one identifying input corresponding to work piece type includes a part number.

15. The apparatus according to claim 11
wherein the controller is configured to enable real time control of at least one of timing and duration of periods of disengagement, responsive at least in part to manual inputs through the at least one input device.

16. The apparatus according to claim 15
wherein the controller is configured to store new machining data corresponding to the at least one of timing and duration of periods of disengagement responsive to real time control.

17. The apparatus according to claim 16
wherein the controller is configured to
receive at least one new identifying input through the at least one input device,
associate the at least one new identifying input with the new machining data in the at least one data store.

18. The apparatus according to claim 17
wherein the controller is configured to
use the new machining data to vary at least one of timing and duration of the periods of disengagement responsive to the new machining data, responsive at least in part to input of the new identifying input through the at least one input device.

19. The apparatus according to claim 17 and further including:
a tool actuator in operative connection with the tool, wherein the tool actuator is operative to cause the tool to move relative to the work piece along a direction other than a rotational direction at the work station during machining,
wherein the tool actuator is in operative connection with the controller,
wherein the controller is configured to control tool speed along the direction relative to the work piece during machining.

20. The apparatus according to claim 19
wherein the actuator is operative to move the tool along the direction in a first direction relative to the work piece and the controller is configured to stop movement of the tool in the first direction during machining for a plurality of brief actuator stop periods, wherein after each actuator stop period, the actuator continues to move the tool in the first direction relative to the work piece,
and wherein after moving the tool in the first direction a distance, the controller is operative to cause the actuator to move the tool along the direction in a second direction opposite the first direction.

21. The apparatus according to claim 20
wherein the tool comprises a cutting tool that engages the work piece transversely to an axis of rotation of the work piece at the tool station.

22. The apparatus according to claim 20
wherein the tool comprises a cutting tool that engages the work piece generally coaxially with an axis of rotation of the work piece at the tool station.

23. The apparatus according to claim 20
wherein the tool comprises a cutting tool
wherein the cutting tool
(a) engages the work piece transversely to an axis of rotation of the work piece at the tool station or
(b) engages the work piece generally coaxially with an axis of rotation of the work piece at the tool station.

24. The apparatus according to claim 19 wherein the controller is configured to enable at least one of real time speed and direction control of the tool actuator responsive at least in part to at least one manual input through the at least one input device,
wherein the controller is configured to store new machining data corresponding to at least one of real time speed and direction control of the tool actuator.

25. Apparatus comprising:
a multi-spindle machine including a plurality of rotatable spindles,
wherein each spindle is configured to hold and rotate a metal work piece,
wherein the machine is configured to move each spindle and engaged work piece to a plurality of disposed stations,
wherein the machine is configured to cause work pieces in a plurality of the disposed stations to undergo machining generally concurrently,
a metal cutting tool movably positioned adjacent to a tool station,
wherein the tool is movable to engage a work piece at the tool station,
wherein tool engagement with the work piece during machining produces metal chips,
a tool actuator in operative connection with the tool, wherein the tool actuator is operative to cause the tool to move relative to the work piece along a direction other than a rotational direction at the tool station during machining,
a high speed fluid actuated clutch,
a low speed fluid actuated clutch,
at least one electrically actuated fluid control valve,
wherein the at least one fluid control valve is in operative connection with the high speed clutch and the low speed clutch,
wherein the at least one fluid control valve is selectively operative to cause fluid pressure to be applied to and removed from the high speed clutch and the low speed clutch,
wherein the application of fluid pressure to a respective clutch causes the respective clutch to be engaged and the removal of fluid pressure causes the respective clutch to be disengaged,
a controller,
wherein the controller includes circuitry specifically adapted for machine control and which includes at least one processor and at least one data store,
wherein the controller is in operative connection with the at least one fluid control valve and the tool actuator, wherein the controller is configured to cause
- the high speed clutch to be engaged during a high speed portion of a machine cycle when the spindles are moving between stations,
- the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining, and wherein the controller controls tool speed along the direction during machining,
- the low speed clutch to disengage for brief predetermined periods during the low speed portion of the machine cycle while the tool engaged work piece at the tool station undergoes machining,
- wherein the disengagement of the low speed clutch for the periods breaks the continuity of chips generated by tool engagement with the work piece at the tool station.

26. The apparatus according to claim 25 and further including
- at least one manual input device, wherein the at least one manual input device is in operative connection with the at least one controller,
- wherein periods of disengagement of the low speed clutch and speed of the tool actuator during machining are changeable responsive at least in part to at least one input through the at least one input device.

27. Apparatus usable in connection with a multi-spindle machine including a plurality of rotatable spindles,
- wherein each spindle is configured to hold and rotate a metal work piece,
- wherein the machine is configured to move each spindle and engaged work piece to a plurality of disposed stations,
- wherein the machine is configured to cause work pieces in a plurality of the disposed stations to rotate and undergo machining generally concurrently,
- a metal cutting tool movably positioned adjacent to a first station,
  - wherein the tool is movable to engage a work piece at the first station, and tool engagement with the work piece during machining produces metal chips,
- a high speed fluid actuated clutch,
- a low speed fluid actuated clutch,
- at least one electrically actuated fluid control valve,
  - wherein the at least one fluid control valve is in operative connection with the high speed clutch and the low speed clutch,
  - wherein the at least one fluid control valve is selectively operative to cause fluid pressure to be applied to and removed from the high speed clutch and the low speed clutch,
  - wherein the application of fluid pressure to a respective clutch causes the respective clutch to be engaged and the removal of fluid pressure causes the respective clutch to be disengaged,
- the apparatus comprising a controller including circuitry specifically configured for control of the multi-spindle machine and which includes at least one processor and at least one data store, wherein the at least one data store includes machining data,
- wherein the controller is configured to be in operative connection with the at least one fluid control valve,
- wherein the controller is configured to cause
  - the high speed clutch to be engaged during a high speed portion of a machine cycle when the spindles are moving between stations,
  - the low speed clutch to be engaged during a low speed portion of the machine cycle while work pieces are generally concurrently undergoing machining in the plurality of disposed stations, wherein engagement of the low speed clutch causes the spindles and engaged work pieces to rotate while the work pieces undergo machining,
  - the low speed clutch to disengage for brief predetermined periods during a low speed portion of the machine cycle while the tool engaged work piece at the first station undergoes machining, wherein at least one of timing and duration of the periods of disengagement is varied responsive at least in part to the machining data,
  - wherein the disengagement of the low speed clutch for the periods breaks continuity of chips generated by tool engagement with the work piece at the first station.

* * * * *